Dec. 16, 1958     C. BERGER     2,864,243
APPARATUS FOR DEHYDRATING LIQUIDS
Filed Feb. 2, 1956     2 Sheets-Sheet 1

INVENTOR.
CARL BERGER
BY Toulmin & Toulmin
Attorneys

Dec. 16, 1958     C. BERGER     2,864,243
APPARATUS FOR DEHYDRATING LIQUIDS
Filed Feb. 2, 1956     2 Sheets-Sheet 2

INVENTOR.
CARL BERGER

BY *Toulmin & Toulmin*

Attorneys

United States Patent Office 2,864,243
Patented Dec. 16, 1958

2,864,243

APPARATUS FOR DEHYDRATING LIQUIDS

Carl Berger, Dayton, Ohio, assignor, by mesne assignments, to Union Carbide Corporation, New York, N. Y., a corporation of New York Application February 2, 1956, Serial No. 563,059

4 Claims. (Cl. 62—123)

The present invention relates to low-temperature dehydration of aqueous materials containing heat-sensitive solids, more particularly, to an apparatus and method for removing water as ice crystals by circulating aqueous material, maintained at a temperature just below its freezing point, in contact with a surface moving through the material to form ice crystals upon the moving surface.

It is the object of this invention to provide an improved apparatus and method for freeze dehydration of heat-sensitive aqueous materials on non-metallic materials.

It is another object of this invention to provide a continuous process for the low-temperature dehydration of heat-sensitive aqueous materials.

It is an additional object of this invention to provide an apparatus and method for the low-temperature dehydration of heat-sensitive materials wherein ice crystals are continuously removed from a heat-sensitive material circulated past a moving cold surface.

It is a further object of this invention to provide an apparatus for the dehydration of heat-sensitive materials by inducing the formation of ice crystals on a non-metallic surface moving through the material.

The present invention essentially discloses an apparatus for continuous freeze dehydration of heat sensitive aqueous materials which comprises a refrigerated metallic tank maintained at a temperature just below the freezing point of the material. A non-metallic endless belt is moved through the tank in close proximity to the refrigerated surfaces thereof to be refrigerated through the cooling action of the walls. As the belt moves through the material, ice crystals are formed thereon which are removed from the belt when the belt emerges from the tank. Concurrently with the movement of the belt, the material is introduced into the tank at a point remote from the refrigerated surfaces and is drained from the tank at a point adjacent the refrigerated surfaces. The constant circulation of the liquid through the tank combined with the movement of the refrigerated surface upon which the ice crystals are formed, functions to continuously dehydrate the material in the tank. A pre-cooling chamber encloses the belt when it is not immersed in the aqueous material so that the temperature of the belt when it enters the refrigerated tank may be some degrees below the temperature of the tank.

Other objects and advantages of this invention will become apparent upon reference to the accompanying description when taken in conjunction with the following drawings wherein.

Figure 1:
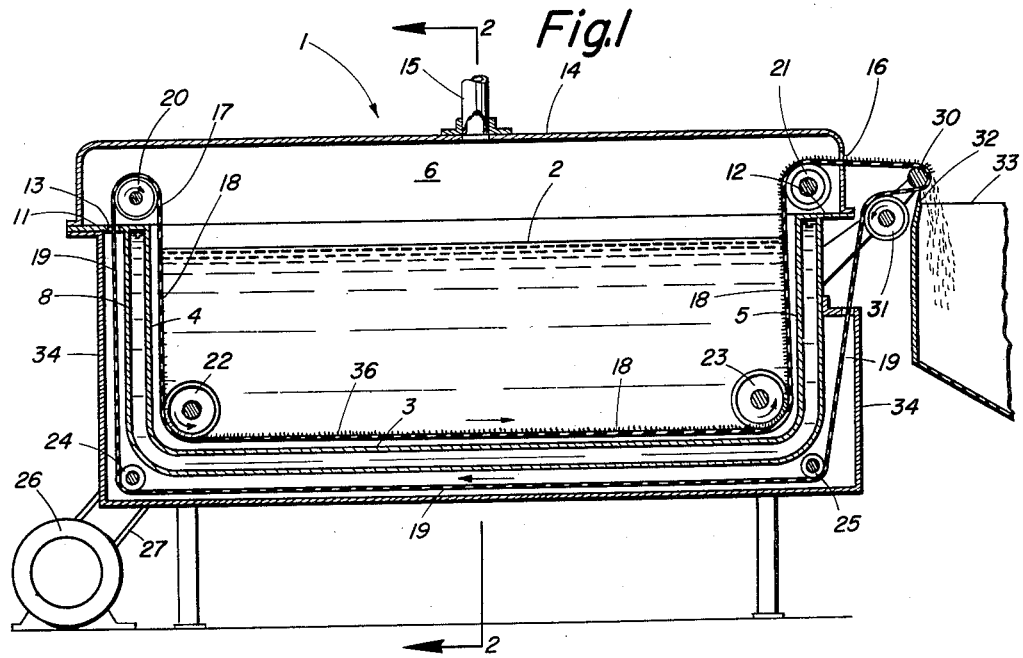
Figure 1 is a vertical sectional view of the freezing apparatus disclosed in this invention.

Referring now to the drawings, more particularly to Figure 1 wherein like reference symbols indicate the same parts throughout the various views, 1 indicates generally a tank which contains an aqueous heat-sensitive material indicated at 2. The tank 1 has a bottom 3, end walls 4 and 5 and side walls 6 and 7. A jacket 8 surrounds the bottom, end and side walls of the tank. A refrigerant is supplied from a suitable source and is pumped through the supply line 9 into the jacket 8 wherein it is circulated and is discharged at 10.

There are external flanges 11 and 12 on the top edges of the end walls 4 and 5, respectively, of the tank. There is an aperture 13 in the tank flange 11. The entire tank is enclosed by a closure member or top wall 14 which is supported at the extreme portions of external portions of the flanges 11 and 12. There is a supply line 15 in the upper surface of the top wall 14 for the admission of heat-sensitive material into the tank 1. There is an opening 16 in the end wall of the closure member 14 supported by the external flange 12.

A moving surface for the formation of ice crystals thereon is in the form of an endless non-metallic flexible belt indicated at 17 which has one reach 18 located within the tank 1 and another reach 19 exterior of the tank. The belt 17 is supported by the idler rollers 20, 21 which are located above the end walls 4 and 5, respectively, of the tank. The rollers 20, 21 have beveled surfaces and are so positioned that the inner reach 18 of the endless belt is in close proximity to the inner surfaces of the end walls 4 and 5. Additional rollers 22, 23 are mounted within the tank adjacent the intersections of the end walls and bottom wall to position the inner reach of the endless belt 17 in close proximity to the bottom and end walls.

The width of the belt is equal to the width of the interior of the tank. Thus the edges of the belt will closely contact the side walls of the tank to deter the juice from entering between the end and bottom walls of the tank and the belt. The belt is, in effect, a moving surface of the tank and is cooled by close positioning to the refrigerated tank walls.

The rollers 22 have a beveled surface to engage the belt 17. Since ice crystals are forming on the surface of the belt contacted by the rollers 23 it is desirable that a minimum area of the rollers contact the belt to minimize breaking of the ice crystals.

The inner reach 18 of the endless belt 17 is so positioned within the tank 1 that the belt either contacts the inner faces of the bottom and end walls or is spaced therefrom only a short distance so that the refrigerant within the jacket 8 cools the inner reach of the endless belt.

Idler rollers 24, 25 are located exteriorly of the tank at the intersections of the bottom and end walls to support the outer reach 19 of the endless belt. The belt 17 is driven by an electric motor 26 which is drivingly connected by a belt 27 to a pulley 28 mounted on the extremity of a shaft 29 which supports the pulleys 22.

All of the aforementioned rollers are adjustably mounted to provide for variation of the refrigeration and pre-cooling of the endless belt by modifying the distance of the reaches from the refrigerating jacket.

As the non-metallic belt 17 exits from the tank, it passes over an idler roller 30 of relatively small diameter which causes flexing of the belt 17 as it passes around said roller. The belt 17 reverses its direction while passing over the roller 30 to pass over an idler roller 31 which forwards the belt over an idler roller 25.

Figures 2, 3:
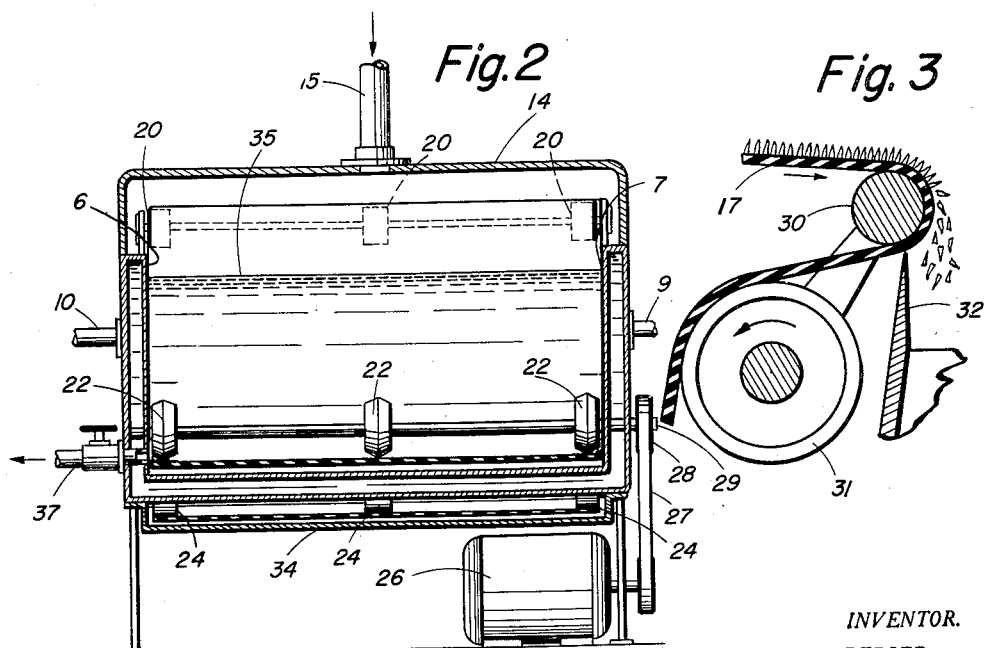
Figure 2 is a sectional view taken along the lines 2—2 of Figure 1.
Figure 3 is a fragmentary sectional view showing the details of construction in enlarged scale of the belt-flexing mechanism illustrated in Figure 1.

The flexing of the belt 17 as it passes over the roller 30 will result in the removal of any ice crystals adhering to the surface of the belt, as indicated in detail in Figure 3. Any ice which is not removed by the flexing of the belt is removed by a scraper 32 which forms an upper edge of a container 33 for receiving the ice crystals removed from the belt.

There will be some ice formation on the underside of the belt as it passes through the tank. This ice may be removed by a scraper positioned as shown in and described relative to Figures 4 and 6. When the belt is in contact with the inner faces of the bottom and end wall the ice formation on the underside or contacting surface will be relatively small.

As the non-metallic flexible belt passes over the roller 31, it enters a chamber 34 which surrounds the outer reach 19 of the endless belt 17. This chamber 34 is insulated and is maintained at a low temperature by the refrigerant circulating through the jacket 8. The chamber 34 serves as a pre-chilling chamber prior to the entrance of the endless belt 17 into the tank.

Figure 4:
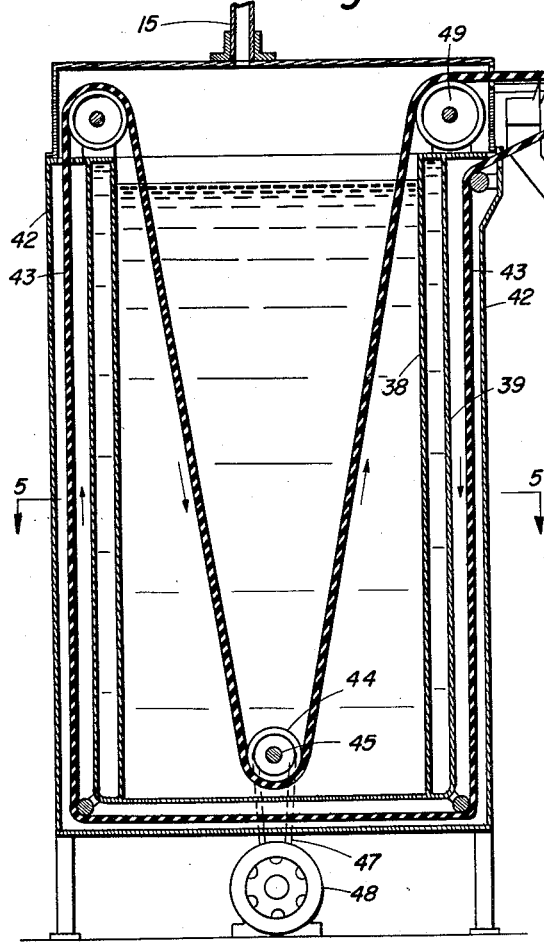
Figure 4 is a detail sectional view of a modification of the freezing tank.
Figure 5:
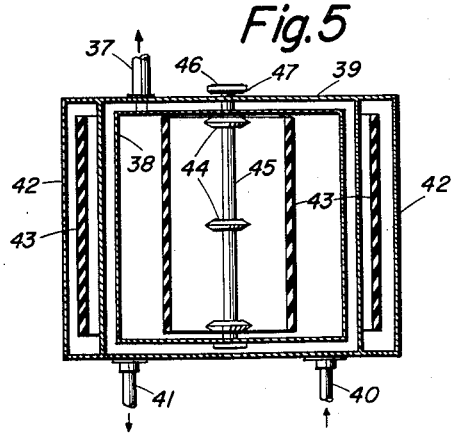
Figure 5 is a sectional view taken along the lines 5—5 of Figure 4.

Proceeding now to Figures 4 and 5, there is illustrated therein a modification of the freezing tank of this invention and the arrangement of the non-metallic belt therein. The freezing tank of this modification is indicated at 38, is substantially square in cross-section and is considerably deeper than its width. This is in contrast to the relatively shallow tank illustrated in the embodiment of this invention in Figures 1 through 3.

The modified tank 38 has a jacket 39 about the vertical walls thereof through which a refrigerant is circulated through the inlet 40 and outlet 41 to maintain the tank at a predetermined low temperature. A pre-chilling chamber 42 surrounds the jacket 39 and encloses a non-metallic flexible belt 43 therein. The roller arrangement supporting the belt exterior of the tank 38 is similar to that illustrated and described in connection with the modification of Figure 1.

However, within the tank there is a single set of rollers 44 mounted on a shaft 45 which is positioned proximate the bottom of the tank 38. The rollers 44 have a bevel surface, as shown in Figure 5, so that a minimum of roller area contacts the surface of the non-flexible belt upon which the ice crystals are forming.

There is a drive pulley 46 on that portion of the shaft 45 which extends outwardly of the jacket 39. The drive pulley 46 is drivingly connected by a belt 47 to an electric motor 48 which supplies the power for moving the belt 43.

By employing a deep tank as illustrated in Figure 4, and by positioning one set of rollers proximate the bottom thereof, the belt will be submerged within the aqueous material for a considerable portion of its travel. This will permit the formation of ice crystals on both surfaces of the belt, which crystals will represent a considerable amount of water removed from the aqueous material.

As the belt 43 emerges from the material within the tank 38, it passes over idler rollers 49 which have bevel surfaces. After exiting from the tank, one surface of the belt 43 passes over a scraper 50 which removes the ice crystals adhering to the lower surface of the belt. The separated crystals are conveyed through a chute 51 into a container 52.

The conveyor belt then passes over an idler roller 53 which has a small radius. The small radius of the roller 53 causes considerable flexing of the outer surface of the belt 43. This flexing results in the separation of the ice crystals from the outer surface of the belt 43 and the separated crystals descend into the container 52. A scraper 54 is provided beneath the roller 53 to remove any remaining ice crystals adhering to the belt after the belt has been flexed. The ice crystals may then be discharged as waste or utilized to cool various components of the freezing apparatus.

During the passage of the belt through the tank, liquid is being introduced into the tank through conduit 15 at the same rate that the dehydrated liquid is withdrawn at 37. Therefore, the total quantity of water within the tank is maintained substantially constant, but the water content of the liquid at the bottom of the tank is lower because of the low temperature dehydration thereof.

Figure 6:
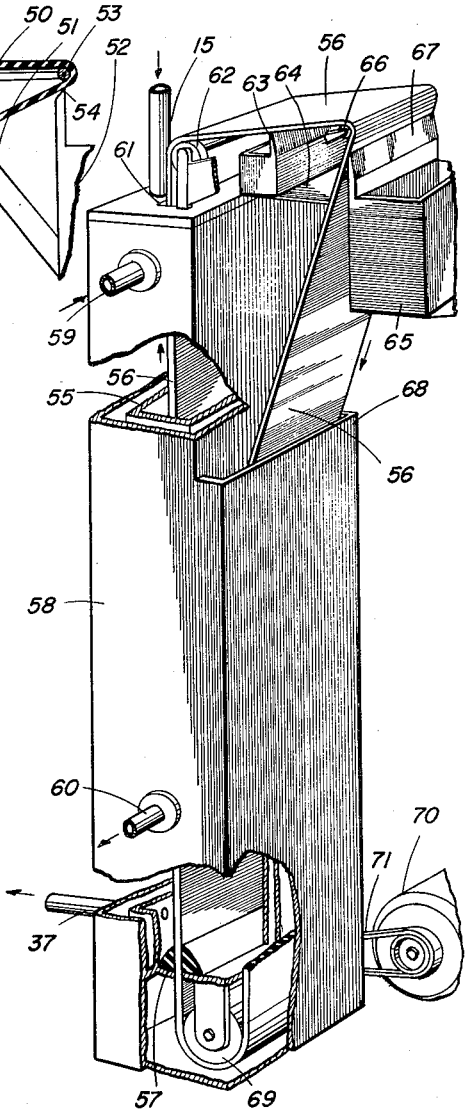
Figure 6 is a perspective view with portions removed of another modification of the freezing tank.

Proceeding next to Figure 6, there is illustrated another modification of the freezing apparatus of this invention. In this modification the non-metallic belt upon which the ice crystals are formed is passed through the aqueous material in a straight line.

In this modification the heat sensitive aqueous material is continuously circulated through a tubular tank 55 which is arranged in a vertical position through a supply line 15 and drain 37.

A non-metallic endless belt 56 enters the bottom of the tank 55 through a flexible seal 57. A jacket 58 into which refrigerant is circulated through the supply 59 and withdrawn through the discharge line 60 surrounds the tank 55 and maintains the tank at a low temperature.

As the endless belt 56 progresses upwardly through the tank 55 ice crystals are formed on both surfaces thereof. As the belt 56 emerges from the tank through an opening 61 it is conveyed over idler rollers 62 which have bevel surfaces to minimize breaking of ice crystals formed on the belt. The belt 56 passes over a scraper 63 which removes ice crystals from one side of the belt. These crystals drop into a chute 64 and are conveyed into a container 65. As the belt passes over the scraper it is flexed by passing over a small radius roller 66. This flexing of the belt removes ice crystals from the other surface of the belt 56. The crystals removed by the flexing are similarly dropped into the container 65. A scraper 67 is positioned beneath the roller 56 to remove any crystals from the belt which were not separated by the flexing thereof. The belt then proceeds into a chamber 68 wherein it is pre-chilled prior to passing over a roller 69 and entrance into the bottom of the freezing tank 55. Movement of the belt is achieved by an electric motor 70 which drives a belt 71 which is connected to a drive pulley secured to the end of the shaft supporting the roller 69.

With this arrangement, it can be seen that substantially one-half of the belt is continuously immersed in the liquid. This presents a greater amount of area upon which ice crystals can be formed. Furthermore, since the passage of the belt through the liquid is in a straight line, there will be no breaking of the crystals upon the belt until the belt has emerged from the tank and it is desired to remove the crystals from the belt.

In order to fully explain the mode of operation of the apparatus disclosed by this invention, the nature of the freezing process occurring within the disclosed apparatus is next discussed.

It has been found that when a non-metallic surface is exposed to an aqueous material maintained at a low temperature, long needle-like ice crystals will form on the non-metallic surface in a direction perpendicular thereto. This ice crystal formation has been found to occur on a number of non-metallic materials, including Lucite, glass, polyvinyl chloride and wax. Furthermore, the thickness of the non-metallic walls may vary between one-sixteenth of an inch and two inches.

While needle-like crystals are formed in the early stages of the process, after a period of time, the ice formation will comprise needle-like ice crystals with sheet or plane ice filling the voids between adjacent spear-like crystals. The structure, however, is still crystalline in form rather than being a solid sheet of ice.

When a thin metallic coating of the order of one-quarter of an inch is placed upon a non-metallic surface and the coating exposed to an aqueous material, a similar long needle-like ice crystal formation occurs.

Increasing the thickness of a metallic coating upon the non-metallic surface up to about two inches results in clusters of thin needle-like ice crystals upon the surface connected by planes of sheet ice. Again, however, the ice structure is crystalline rather than in sheet form as would normally occur upon a metallic surface contacting aqueous material.

It is believed that the spear-like growth of ice crystals may be correlated with low thermal conductivity.

It is well known that heat will flow through the path of least resistance toward a given heat sink. Assuming a non-metallic surface, such as Lucite, it will be readily apparent that the heat flows through the ice much more rapidly than through the plastic. This condition will favor a narrow, needle-like growth perpendicular to the surface and into the aqueous material. To the contrary, metallic surfaces, which are of relatively high conductivity, will tend to absorb heat rapidly through their surfaces and consequently the ice formed tends to spread out over the surfaces in thin sheets.

Bearing the foregoing freezing process in mind, the operation of the apparatus of this invention will be presently described. While this dehydration process may be applied to any aqueous material containing heat sensitive solids, the typical process will be described as applied to orange juice comprising 12% solids. An orange juice of this concentration has an initial ice-forming point of 28 degrees Fahrenheit.

A refrigerant maintained at a suitable temperature is circulated through the jacket 8 to maintain the temperature of the tank 1 at a temperature of 27 degrees Fahrenheit, or just below the freezing point of the orange juice. Orange juice is then introduced through the supply line 15 into the tank until it reaches a level indicated at 35. Since the coolest region of the tank is proximate the bottom wall 3, the layer of juice in contact with the bottom wall 3 will attain the temperature of the tank which, as previously mentioned, was just below the freezing point of the orange juice. At this point ice crystals will commence to form upon the inner reach of the endless belt 17, as indicated at 36. As the needle-like ice crystals form upon the endless belt 17, they are carried from the tank 1 through the aperture 16 where they are removed by means of the roller 30 and the scraper 32.

Concurrently with the movement of the endless belt through the tank 1, that layer of orange juice adjacent the bottom 3 of the tank is drained through the discharge line 37. This layer of juice which is being drained will be dehydrated since a considerable quantity of water has been removed therefrom by the formation of the ice crystals upon the endless belt as it passes in close proximity to the bottom wall 3.

In some instances it may be necessary to make several passes with the belt before the dehydrated juice is withdrawn. This would be desirable when the quantity of ice removed is not sufficient to increase the concentration of the withdrawn juice to the degree desired.

Fresh orange juice is introduced into the tank through supply line 15 at the same rate as the dehydrated juice is withdrawn. Consequently the level of the juice within the tank will remain as indicated at 35. When the incoming fresh juice contacts the moving belt 17 it is at 27 degrees Fahrenheit. This will result in a freezing of the water in the form of long needle-like ice crystals on the upper surface of the moving belt. Hence, the belt functions to remove ice from the solution.

Even though the temperature of the juice is below the freezing point, the belt is the agent responsible for removing the ice. The lower temperature of the juice is desirable to prevent the heat of fusion from elevating the temperature to such a degree that ice formation on the belt will not occur. The belt should be colder than the juice. The belt enters the juice at a temperature of 10–15° F. since it will be somewhat warmed by the heat of fusion absorbed by the belt during the ice formation process.

The orange juice is initially at a room temperature of the order of 70 degrees when introduced into the tank 1. When it contacts the refrigerated surfaces thereof, the temperature of the juice is abruptly and suddenly dropped to substantially the temperature of the tank. This sudden and abrupt drop in temperature is known as "thermal shock". It is the combined effect of the thermal shock of the juice plus maintaining the juice at a temperature just below its freezing point that produces the formation of needle-like ice crystals upon the moving endless non-metallic belt.

A multi-belt system may be used instead of the single belt system disclosed in the various embodiments of the invention. This would increase the efficiency of the process and the production of dehydrated liquid.

Also the belt means disclosed may be equipped with metallic portions. Either section of the belt may be metallic or the belt may comprise a flexible, non-metallic casing enclosing a metal core which might be in the nature of a powdered metal matrix. With this modification the apparatus will have increased efficiency since metal will conduct heat in and out of solution more rapidly than plastics, leather and the like. However, the ice crystal formation will not be the same but the quantity of ice removed from the solution per unit time will be greater.

Typical heat sensitive materials are chemicals such as benzene, resins and the like; foods such as milk, beer, wine; and food components such as fruit and vegetable juices; vinegar and the like. It is desired to comprehend in this invention any materials which can be dehydrated by freezing.

It will be understood that while the apparatus and method disclosed and described herein illustrate a preferred form of the invention, modification can be made without departing from the spirit and scope of the invention, and that all modifications that fall within the scope of the appended claims are intended to be included herein.

What is claimed is:

1. In an apparatus for the low temperature dehydration of aqueous heat sensitive materials, a metallic tank with at least one surface thereof being refrigerated and containing said aqueous material, and a flat non-metallic belt movable within said tank refrigerated by said refrigerated tank surface and sealingly engaged with opposed walls of the tank whereby water is removed from said aqueous material as ice crystals adhering to said belt.

2. In an apparatus for the low temperature dehydration of aqueous heat sensitive materials, a tank for containing the heat sensitive materials, a jacket around said tank, means for circulating refrigerant within said jacket for refrigerating said tank, an endless belt of non-metallic material movable in said tank in close proximity to the refrigerated walls thereof whereby needle-like ice crystals are formed on said belt, and means for removing said ice crystals from said belt.

3. In an apparatus for the low temperature dehydration of aqueous heat sensitive materials, a tank having a bottom, side, and end walls and containing aqueous material, an endless belt movable in close proximity to said bottom and end walls and through said aqueous material, said belt being in sealing engagement with said side walls so as to form an inner surface of the tank, means for refrigerating said bottom and end walls to lower the temperature of said belt whereby water is removed from said material in the tank in the form of ice crystals adhering to said belt, and means for removing said ice crystals from said belt.

4. In an apparatus for the low temperature dehydration of aqueous heat sensitive materials, a metallic tank having a top and bottom and end walls for containing said material, a jacket surrounding said bottom and end walls, means for circulating a refrigerant within said jacket to refrigerate said tank, a moving endless belt of non-metallic material with one reach being within said tank and proximate to the said bottom and end walls and the other reach being exterior of said tank and jacket, said one reach being refrigerated from said proximate walls whereby water is removed from the material in the form of ice crystals adhering to said belt, means for removing said ice crystals from said belt as the belt emerges from said tank, means for pre-chilling said belt prior to entering said tank, means for supplying aqueous material through said top wall, means for withdrawing the dehydrated material from adjacent said refrigerated bottom wall whereby a circulation of material through said tank concurrently with the movement of said endless belt therethrough continuously removes water from said material to dehydrate the same.

References Cited in the file of this patent

UNITED STATES PATENTS

| | | |
|---|---|---|
| 1,451,901 | Field | Apr. 17, 1923 |
| 1,451,904 | Field | Apr. 17, 1923 |
| 1,742,194 | Bennett | Jan. 7, 1930 |
| 2,005,734 | Field | June 25, 1935 |
| 2,064,655 | Geyer | Dec. 15, 1936 |
| 2,078,938 | Field | May 4, 1937 |
| 2,101,055 | Field | Dec. 7, 1937 |
| 2,538,097 | Henderson | Jan. 16, 1951 |
| 2,546,005 | Knowles | Mar. 20, 1951 |
| 2,602,304 | Randell | July 8, 1952 |
| 2,603,667 | Pankratz | July 15, 1952 |
| 2,622,114 | Carney | Dec. 16, 1952 |
| 2,646,666 | Vlasic | July 28, 1953 |